US009631108B2

(12) United States Patent
Secord et al.

(10) Patent No.: US 9,631,108 B2
(45) Date of Patent: Apr. 25, 2017

(54) INK COMPOSITIONS

(71) Applicant: Markem-Imaje Corporation, Keene, NH (US)

(72) Inventors: Michael P. Secord, West Chesterfield, NH (US); Richard C. Woudenberg, Keene, NH (US); Joyce Bemis, Keene, NH (US)

(73) Assignee: Markem-Imaje Corporation, Keene, NH (US)

( * ) Notice: Subject to any disclaimer, the term of this patent is extended or adjusted under 35 U.S.C. 154(b) by 0 days.

(21) Appl. No.: 14/855,218

(22) Filed: Sep. 15, 2015

(65) Prior Publication Data

US 2016/0083602 A1 Mar. 24, 2016

Related U.S. Application Data

(60) Provisional application No. 62/209,788, filed on Aug. 25, 2015, provisional application No. 62/052,241, filed on Sep. 18, 2014.

(51) Int. Cl.

| | | |
|---|---|---|
| B05D 3/06 | (2006.01) | |
| B32B 9/04 | (2006.01) | |
| B32B 27/30 | (2006.01) | |
| B32B 27/38 | (2006.01) | |
| B41J 2/02 | (2006.01) | |
| B41J 2/095 | (2006.01) | |
| B41J 2/17 | (2006.01) | |
| B41J 2/435 | (2006.01) | |
| B33Y 10/00 | (2015.01) | |
| B33Y 70/00 | (2015.01) | |
| B33Y 80/00 | (2015.01) | |
| C09D 11/12 | (2006.01) | |
| C09D 11/30 | (2014.01) | |
| C09D 11/34 | (2014.01) | |
| C09D 11/38 | (2014.01) | |
| C09D 11/52 | (2014.01) | |
| C09D 11/101 | (2014.01) | |
| B32B 27/00 | (2006.01) | |

(52) U.S. Cl.
CPC ............. *C09D 11/52* (2013.01); *B05D 3/067* (2013.01); *B32B 9/045* (2013.01); *B32B 27/00* (2013.01); *B32B 27/30* (2013.01); *B32B 27/308* (2013.01); *B32B 27/38* (2013.01); *B33Y 10/00* (2014.12); *B33Y 70/00* (2014.12); *B33Y 80/00* (2014.12); *B41J 2/02* (2013.01); *B41J 2/095* (2013.01); *B41J 2/1721* (2013.01); *B41J 2/435* (2013.01); *C09D 11/101* (2013.01); *C09D 11/12* (2013.01); *C09D 11/30* (2013.01); *C09D 11/34* (2013.01); *C09D 11/38* (2013.01)

(58) Field of Classification Search
CPC ......... B05D 3/067; B32B 9/045; B32B 27/30; B32B 27/308; B32B 27/38; B41J 2/02; B41J 2/095; B41J 2/1721; B41J 2/435; B33Y 10/00; B33Y 70/00; B33Y 80/00; C09D 11/12; C09D 11/30; C09D 11/34; C09D 11/38; C09D 11/52; C09D 11/101
See application file for complete search history.

(56) References Cited

U.S. PATENT DOCUMENTS

| | | | |
|---|---|---|---|
| 4,303,924 A | 12/1981 | Young, Jr. | |
| 5,275,646 A | 1/1994 | Marshall et al. | |
| 5,286,288 A * | 2/1994 | Tobias | ................... C09D 11/34 106/31.29 |
| 5,350,446 A * | 9/1994 | Lin | ........................ C09D 11/34 106/31.61 |
| 5,434,609 A * | 7/1995 | Rhodes | ...................... B41J 2/09 347/73 |
| 5,623,001 A | 4/1997 | Figov | |
| 5,693,129 A | 12/1997 | Lin | |
| 5,863,319 A | 1/1999 | Baker et al. | |
| 5,891,228 A | 4/1999 | Baker et al. | |
| 6,057,399 A | 5/2000 | King | |
| 6,210,536 B1 | 4/2001 | Grossi et al. | |
| 6,702,884 B2 | 3/2004 | Brown | |
| 7,192,121 B2 * | 3/2007 | Barbet | ..................... B41J 2/025 347/55 |
| 7,322,688 B2 | 1/2008 | Woudenberg | |
| 7,794,790 B2 | 9/2010 | Michels et al. | |
| 8,162,450 B2 | 4/2012 | Barbet | |
| 8,540,350 B2 | 9/2013 | Barbet | |
| 2013/0307891 A1 | 11/2013 | Barbet et al. | |
| 2014/0168322 A1 | 6/2014 | Bonneton | |

FOREIGN PATENT DOCUMENTS

| | | |
|---|---|---|
| EP | 465039 A1 | 1/1992 |
| EP | 1705228 A1 | 9/2006 |
| EP | 1849841 B1 | 6/2009 |
| EP | 2662424 A1 | 11/2013 |

(Continued)

OTHER PUBLICATIONS

English abstract of JP 2006-335995, Yamamoto et al., Dec. 2006.*
International Application No. PCT/US2015/050121, Notification of Transmittal of the International Search Report and the Written Opinion of the International Searching Authority, mailed Apr. 7, 2016, 24 pages.
International Application No. PCT/US2015/050121, Invitation to Pay Additional Fees and, Where Applicable, Protest Fee, dated Dec. 17, 2015, 6 pages.

*Primary Examiner* — Patrick Niland
(74) *Attorney, Agent, or Firm* — Fish & Richardson P.C.

(57) ABSTRACT

This disclosure relates to an ink composition (e.g., a hot melt ink composition or a radiation curable ink composition) that has a relatively low conductivity. This disclosure also relates to a continuous printing process using such a composition and a product containing such a composition.

28 Claims, 2 Drawing Sheets

(56) References Cited

FOREIGN PATENT DOCUMENTS

| JP | 2006-335995 | * | 12/2006 |
|----|-------------|---|---------|
| WO | 2012/068182 |   | 5/2012  |

* cited by examiner

INK COMPOSITIONS

CROSS REFERENCE TO RELATED APPLICATIONS

This application claims priority to U.S. Provisional Application No. 62/209,788, filed on Aug. 25, 2015 and U.S. Provisional Application No. 62/052,241, filed on Sep. 18, 2014. The entire contents of the foregoing applications are hereby incorporated by reference.

TECHNICAL FIELD

This disclosure relates to ink compositions, as well as related products and processes.

BACKGROUND

During ink jet printing, the ink is typically ejected through a component of a printhead (e.g., an array of nozzles) onto a substrate.

The inks used in ink jet printing can be hot melt inks. Hot melt inks are a solid at ambient temperature and a liquid at temperatures above ambient temperature. Hot melt inks can be used, for example, in digital printing methods. During printing, the ink is typically heated until it becomes a liquid which is then ejected through a printhead onto a substrate. The ink can solidify on the substrate at ambient temperature.

The hot melt ink can be used with an inkjet printer having heating capabilities, which can eject droplets of ink through tiny nozzles to form small dots, which in turn form an image on a substrate. The resolution of the image printed by the ink is typically measured by the number of dots per inch (DPI).

The inks used in ink jet printing can also be radiation (e.g., ultraviolet (UV)) curable inks. When radiation curable inks are used, the ejection of ink can be followed by a curing step as a means to control flow. For example, one method of curing involves exposing to UV radiation a UV curable ink, which contains reactive reagents that polymerize or cross-link upon exposure to UV radiation.

SUMMARY

This disclosure is based on the unexpected discovery that certain ink compositions (e.g., hot melt ink compositions or radiation curable ink compositions) can be used in a continuous printing process for selectively projecting portions of an ink stream (which has substantially no net electric charge) onto a substrate to form an image. Such a continuous printing process can have the advantages of both drop-on-demand printing and continuous printing processes, such as improved printing quality, avoiding using volatile solvents, and allowing a relative large distance between a printhead and the substrate.

In one aspect, this disclosure features a printing process that includes melting a hot melt ink composition in a printhead in an ink jet printer, and ejecting the hot melt ink composition from the printhead continuously to form an ink stream, the ink stream having substantially no net electric charge. The hot melt ink composition includes at least one wax and at least one conductive agent.

In another aspect, this disclosure features a hot melt ink composition that includes at least one wax and at least one conductive agent. The composition has a conductivity of from about 5 $\mu$S/cm to about 150 $\mu$S/cm in a melted state.

In another aspect, this disclosure features a printing process that includes ejecting an ink composition from a printhead in an ink jet printer continuously to form an ink stream. The ink stream has substantially no net electric charge. The ink composition includes at least one radiation curable material and at least one conductive agent.

In another aspect, this disclosure features an ink composition that includes at least one radiation curable material and at least one conductive agent. The composition has a conductivity of from about 5 $\mu$S/cm to about 150 $\mu$S/cm in a liquid state.

In still another aspect, this disclosure features a product that includes a substrate (e.g., a cardboard or a film) and a solid ink defining an image (e.g., a 3-D article) on the substrate. The solid ink includes any of the ink compositions (e.g., a hot melt ink composition or a radiation curable ink composition) described herein.

Embodiments can have one or more of the following features.

The printing process can further include deflecting the ink stream by at least one deflection electrode to an ink recovery gutter. In such embodiments, the printing process can further include forming ink drops that are substantially not deflected by the at least one deflection electrode and directing the ink drops to a substrate to form an image (e.g., a 3-D article).

In some embodiments, the printing process can further include forming ink drops that are substantially not deflected by at least one deflection electrode and directing the ink drops to an ink recovery gutter. In some embodiments, the printing process can further include deflecting the ink stream by at least one deflection electrode to a substrate to form an image.

The ink stream and ink drops can have substantially no net electric charge.

The composition can have a conductivity of from about 5 $\mu$S/cm to about 1000 $\mu$S/cm (e.g., from about 5 $\mu$S/cm to about 100 $\mu$S/cm, from about 5 $\mu$S/cm to about 150 $\mu$S/cm, or from about 5 $\mu$S/cm to about 75 $\mu$S/cm) in a melted or liquid state.

In some embodiments, the at least one wax can include an amide alcohol wax, a C6-C58 primary alcohol wax, a C6-C58 carboxylic acid wax, a urethane wax, an ether wax, or an ester wax. In some embodiments, the at least one wax can be an acrylate wax, a vinyl wax, or an epoxy wax.

The amide alcohol wax can be lauryl monoethanolamide, stearyl monoethanolamide, lauryl isopropanolamide, or coconut fatty acid diethanolamide. The ester wax can be ethylene glycol distearate.

In some embodiments, the composition can include from about 70 wt % to about 99 wt % of the at least one wax. In some embodiments, the composition can include from about 1 wt % to about 50 wt % of the at least one wax.

The at least one conductive agent can include a salt. For example, the salt can be a quaternary phosphonium salt (e.g., a tetraalkylphosphonium salt), a quaternary ammonium salt (e.g., a tetraalkylammonium salt), an imidazolium salt, or an alkali salt. In some embodiment, the salt is a liquid electrolyte at ambient temperature.

In some embodiments, the composition can include from about 0.05 wt % to about 5 wt % of the at least one conductive agent.

The composition can further include at least one colorant. In some embodiments, the at least one colorant can include a dye or a pigment. In some embodiments, the composition can include from about 0.1 wt % to about 10 wt % of the at least one colorant.

The at least one radiation curable material can include at least one acrylate, vinyl, or epoxy group. For example, the at least one radiation curable material can include an acrylate material, a vinyl material, or an epoxy material. The composition can include from about 10 wt % to about 99 wt % of the at least one radiation curable material.

The composition can further include at least one photoinitiator. In some embodiments, the at least one photoinitiator can include a ketone, a phosphine oxide, a phosphinate, a sulfonium salt, an iodonium salt, or a mixture thereof. In some embodiments, the composition can include from about 0.1 wt % to about 10 wt % of the at least one photoinitiator.

The composition can further include at least one solvent. In some embodiments, the composition can include from about 1 wt % to about 80 wt % of the at least one solvent.

The composition can include particles and the particles can have an average particle diameter of from about 2 μm to about 30 μm.

The composition can further include at least one resin, at least one tackifier, at least one surfactant, at least one polymerization inhibitor, at least one antioxidant, or at least one dispersant.

In some embodiments, the composition can have a viscosity (e.g., a melt viscosity) of from about 1 cP to about 25 cP measured at a jetting temperature (e.g., 125° C.).

In some embodiments, the composition can consist of (1) the at least one wax, (2) the at least one conductive agent, (3) optionally, the at least one colorant, (4) optionally, at least one resin, (5) optionally, at least one tackifier, (6) optionally, at least one plasticizer, (7) optionally, at least one antioxidant, and (8) optionally, at least one dispersant. In some embodiments, the composition can consist of (1) at least one radiation curable material, (2) at least one conductive agent, (3) optionally, at least one photoinitiator, (4) optionally, at least one colorant, (5) optionally, at least one surfactant, (6) optionally, at least one polymerization inhibitor, (7) optionally, at least one antioxidant, or (8) optionally, at least one dispersant.

Other features, objects, and advantages will be apparent from the description, drawings, and the claims.

DETAILED DESCRIPTION

Figure 1A:
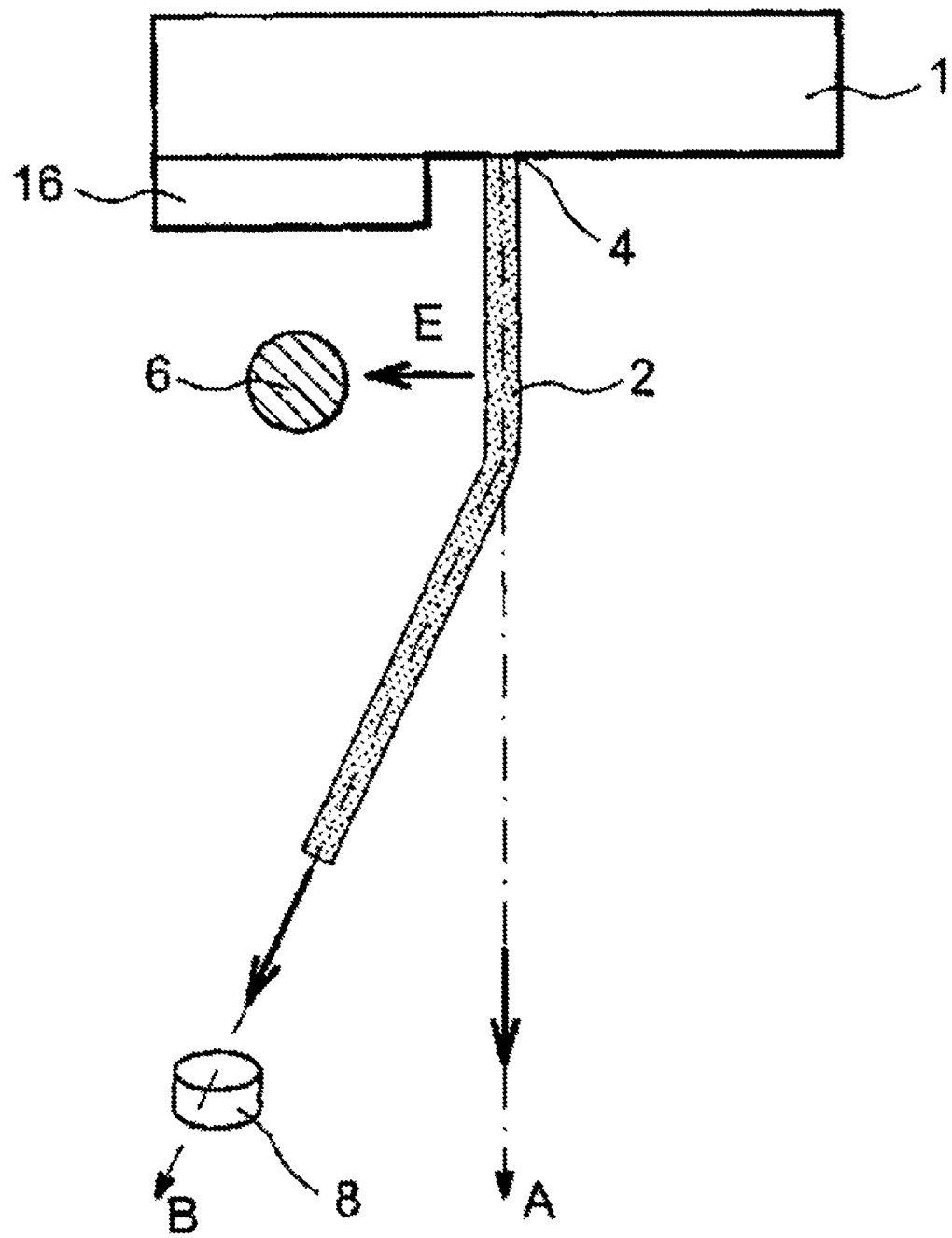
FIGS. 1A and 1B illustrate a process of deflecting a continuous ink stream by an electric field into an ink recovery gutter and projecting un-deflected ink segments to a substrate to form an image.

This disclosure generally relates to ink compositions that can be used in a continuous printing process for selectively projecting portions of an ink stream onto a substrate to form an image. In some embodiments, the ink compositions described herein can be a hot melt ink composition or a radiation curable ink composition.

Hot Melt Ink Composition

In general, the hot melt ink composition contains at least one wax and at least one conductive agent.

The hot melt ink composition generally should contain enough wax such that the ink composition, as a whole, is a hot melt material. In some embodiments, the total amount of the wax in the ink composition is at least about 70 wt % (e.g., at least about 75 wt %, at least about 80 wt %, at least about 85 wt %, or at least about 90 wt %) and/or at most about 99 wt % (e.g., at most about 95 wt %, at most about 90 wt %, at most about 85 wt %, at most about 80 wt %, at most about 75 wt %, or at most about 70 wt %). In some embodiments, the hot melt ink composition contains two or more (e.g., three or four) waxes.

In some embodiments, the wax can be an amide alcohol wax, a C6-C58 primary alcohol wax, a C6-C58 carboxylic acid wax, a urethane wax, an ether wax, or an ester wax. In some embodiment, the wax can be a polar compound to facilitate dissolving and/or dissociating the conductive agent present in the hot melt ink composition.

Exemplary amide alcohol waxes can be alkanolamides having the formula $C_nH_{2n+1}CONRR'$, in which n is an integer from 10-17; each of R and R', independently, is H or $CH_2CH(R_1)OH$; and each $R_1$, independently, is H or $C_1$-$C_4$ alkyl. Examples of such alkanolamides include lauryl monoethanolamide (n=11, R is $CH_2CH_2OH$, and R' is H), stearyl monoethanolamide (n=17, R is $CH_2CH_2OH$, and R' is H), lauryl isopropanolamide (n=11, R is $CH_2CH(CH_3)OH$, and R' is H), or coconut fatty acid diethanolamide (a major component of which is a compound in which n=11, and each of R and R' is $CH_2CH_2OH$).

Exemplary C6-C58 primary alcohol waxes include any of the primary alcohols (e.g., linear or branched monoalcohols, diols, or polyols) having any of 6-58 (e.g., 10-58, 14-58, 20-50, or 25-50) carbon atoms. Commercial examples of monoalcohol waxes include stearyl alcohol available from Aldrich Chemical Milwaukee, Wis. and UNILIN 350 available from Baker Hughes Inc., Houston, Tex. Commercial examples of diols include 1,12-stearyldiol available as Speziol 18/2 from Cognis Corp. USA, Cincinnati, Ohio and 1,10-decanediol available as Speziol 10/2 from Cognis Corp. USA, Cincinnati, Ohio. An example of a polyol is di(trimethylolpropane).

Exemplary C6-C58 carboxylic acid waxes include any of the carboxylic acids (e.g., linear or branched alcohols) having any of 6-58 (e.g., 10-58, 14-58, 20-50 or 25-50) carbon atoms. A commercial example of such a wax is UNICID 350 (available from Baker Hughes Inc., Houston, Tex.).

Exemplary urethane waxes include 2-(2-(3-octadecylureido)ethoxy)ethyl octadecylcarbamate, octadecyl octadecylcarbamate, 2,2,4-trimethylpentane-1,3-diyl bis(stearylcarbamate), [2-ethyl-2-(octadecylcarbamoyloxy-methyl)hexyl]N-octadecylcarbamate, and 36-(octadecylcarbamoyloxy)hexatriacontyl N-octadecylcarbamate.

Exemplary ether waxes include polyethylene glycols (e.g., having a weight average molecular weight of from about 540 g/mol to about 1450 g/mol) and ethoxylated alcohols (e.g., ethoxylated C6-C58 primary alcohols). A commercial example of polyethylene glycol is available from Dow Chemical Co, Midland, Mich., under the trade name Carbowax. A commercial example of an ethoxylated alcohol is UNITHOX 420 available from Baker Hughes Inc., Houston, Tex.

Exemplary ester waxes include hydrogenated castor oil, beeswax, ethylene glycol distearate, behenyl erucate, glycerol tribehenate, $C_{32}$-$C_{36}$ branched alkyl stearate (e.g., BK-40 commercially available from Koster Keunen, Watertown, Conn.), and polyglyceryl-3 stearate.

In general, the hot melt ink composition can include at least one conductive agent. In some embodiments, the conductive agent can be a salt (e.g., an organic salt or an inorganic salt). For example, the salt can be a quaternary phosphonium salt, a quaternary ammonium salt, an imidazolium salt, or an alkali salt.

Exemplary quaternary phosphonium salts include tetraalkylphosphonium salts and tetraarylphosphonium salts (e.g., tetraphenylphosphonium salts). Commercially available tetraalkylphosphonium salts include CYPHOS series of compounds, such as trihexyl(tetradecyl)phosphonium chloride (CYPHOS IL 101), trihexyl(tetradecyl)phosphonium bromide (CYPHOS IL 102), trihexyl(tetradecyl)phosphonium bis-2,4,4-(trimethylpentyl)phosphinate (CYPHOS IL 104), trihexyl(tetradecyl)phosphonium dicyanamide (CYPHOS IL 105), triisobutyl(methyl)phosphonium tosylate (CYPHOS IL 106), tributyl(methyl)phosphonium methylsulfate (CYPHOS IL 108), trihexyl(tetradecyl)phosphonium bistriflamide (CYPHOS IL 109), tributyl(tetradecyl)phosphonium chloride (CYPHOS IL 167), tributyl(ethyl)phosphonium diethylphosphate (CYPHOS IL 169), tributyl(octyl)phosphonium chloride (CYPHOS IL 253), tetrabutylphosphonium chloride (CYPHOS 443T), and tetrabutylphosphonium chloride (CYPHOS 443W), all of which are available from Cytec Industries Inc., Woodland Park, N.J.

Exemplary quaternary ammonium salts include tetraalkylammonium salts and tetraarylammonium salts (e.g., tetraphenylphosphonium salts). Specific examples include tetramethylammonium salts (e.g., tetramethylammonium chloride, tetramethylammonium bromide, tetramethylammonium hexafluorophosphate, or tetramethylammonium tetrafluoroborate), tetraethylammonium salts (e.g., tetraethylammonium chloride, tetraethylammonium bromide, tetraethylammonium hexafluorophosphate, or tetraethylammonium tetrafluoroborate), tetrabutylammonium salts (e.g., tetrabutylammonium chloride, tetrabutylammonium bromide, tetrabutylammonium hexafluorophosphate, or tetrabutylammonium tetrafluoroborate), or tetraphenylammonium salts (e.g., tetraphenylammonium chloride, tetraphenylammonium bromide, tetraphenylammonium hexafluorophosphate, or tetraphenylammonium tetrafluoroborate).

Exemplary imidazolium salts include 1-butyl-3-methylimidazolium chloride, 1-butyl-3-methylimidazolium bromide, 1-butyl-3-methylimidazolium iodide, 1-butyl-3-methylimidazolium hexafluorophosphate, or 1-butyl-3-methylimidazolium tetrafluoroborate.

Exemplary alkali salts include lithium salts (e.g., lithium nitrate, lithium iodide, lithium acetate, lithium methoxide, lithium thiocyanate, or lithium triflate), sodium salts (e.g., sodium nitrate, sodium iodide, sodium acetate, sodium methoxide, sodium thiocyanate, or sodium triflate), potassium salts (e.g., potassium nitrate, potassium iodide, potassium acetate, potassium methoxide, potassium thiocyanate, or potassium triflate), or cesium salts (e.g., cesium nitrate, cesium iodide, cesium acetate, cesium methoxide, cesium thiocyanate, or cesium triflate).

In some embodiments, the conductive agent is a liquid electrolyte at ambient temperature. As mentioned herein, the "ambient temperature" is defined as a temperature from about 20° C. to about 25° C.

In general, the hot melt ink composition can include an amount of the conductive agent that is sufficient to produce a dipole under an electric field (e.g., an electrostatic field). In some embodiments, the composition includes at least about 0.05 wt % (e.g., at least about 0.1 wt %, at least about 0.25 wt %, at least about 0.5 wt %, at least about 1 wt %, at least about 1.5 wt %, at least about 2 wt %, at least about 2.5 wt %, or at least about 3 wt %) and/or at most about 5 wt % (e.g., at most about 4.5 wt %, at most about 4 wt %, at most about 3.5 wt %, or at most about 3 wt %) of the conductive agent. Without wishing to be bound by theory, it is believed that the amount of an inorganic salt can be less than the amount of an organic salt to achieve the same conductivity in the hot melt ink composition.

In some embodiments, the hot melt ink composition can have a relatively low conductivity measured in its molten state. For example, the composition can have a conductivity of at most about 1000 μS/cm (e.g., at most about 500 μS/cm, at most about 200 μS/cm, at most about 150 μS/cm, at most about 100 μS/cm, at most about 75 μS/cm, or at most about 50 μS/cm) and/or at least about 5 μS/cm (e.g., at least about 10 μS/cm, at least about 15 μS/cm, at least about 20 μS/cm, or at least about 25 μS/cm) measured in a molten state. Without wishing to be bound by theory, it is believed that the conductivity of the hot melt ink composition can depend on the polarity of the other ingredients (e.g., a wax) in the composition. For example, it is believed that a hot melt ink composition having a more polar ingredient (e.g., a more polar wax) can have a higher conductivity compared to a hot melt composition having the same amount of a less polar ingredient (e.g., a less polar wax). As another example, it is believed that a hot melt ink composition having a larger amount of a polar ingredient (e.g., a polar wax) can have a higher conductivity compared to a hot melt composition having a smaller amount of the same ingredient.

Without wishing to be bound by theory, it is believed that the hot melt ink composition described herein can have a lower conductivity than a conventional ink composition designed for a continuous inkjet printer at least because the hot melt ink composition described herein does not need to generate net electric charges during the printing process. As such, the hot melt ink composition described herein does not need to include a large amount of the conductive agent, thereby allowing the composition to include a wide range of ingredients and remains jettable in a wide range of viscosities. In addition, without wishing to be bound by theory, it is believed that the hot melt ink composition described herein can have a higher conductivity than a conventional ink composition designed for a drop-on-demand printer (which is typically an insulator and has no conductivity) at least because the hot melt ink composition described herein needs to include a certain amount of a conductive agent so that the composition can produce a dipole under an electric field, which allows unused ink to be deflected by one or more deflection electrodes into an ink recovery gutter.

In some embodiments, the hot melt ink composition can have substantially no net electric charge (i.e., substantially zero net electric charge) in an ink stream or ink drops during the printing process. By contrast, a conventional ink composition for a continuous inkjet printer typically has a relatively large amount of net electric charges to perform the printing process.

In some embodiments, the hot melt ink composition can further include at least one colorant, such as a dye or a pigment. The dye or pigment can be either an organic or inorganic material. Examples of dyes include anthraquinone and perinone reds such as solvent red 172, solvent red 111, solvent red 222, solvent red 207, and solvent red 135; anthraquinone blues such as solvent blue 104, solvent violet 13; anthraquinone greens such as solvent green 3 and solvent green 5; xanthane, quinoline, quinophthalone, pyrazolone, methine, and anthraquinoid yellows such as solvent yellow 98, solvent yellow 33, disperse yellow 54, solvent yellow 93, disperse yellow 82, and solvent yellow 163. Examples of pigments include pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; and pigment white titanium dioxide. Other exemplary dyes or pigments have been described in, e.g., U.S. Pat. Nos. 6,702,884, 5,863,319, and 5,891,228. In some embodiments, the hot melt ink composition can include at least about 1 wt % (e.g., at least about 5 wt %, at least about 10 wt %, or at least about 15 wt %) and/or at most about 25 wt % (e.g., at most about 20 wt %, at most about 15 wt %, at most about 10 wt %, or at most about 5 wt %) of the colorant. In some embodiments, when the hot melt ink composition is used to print a transparent image (e.g., a transparent 3-D article), the ink composition may not include a colorant.

In some embodiments, the hot melt ink composition can include particles. The particles can be colorants (e.g., dispersed dyes or pigments) or other components in the hot melt ink composition. The particles can be suspended in the composition when the composition is in a molten state. In some embodiments, the particles can have a relative large particle diameter. In some embodiments, the particles can have an average particle diameter of at least about 0.1 μm (e.g., at least about 0.5 μm, at least about 1 μm, at least about 2 μm, at least about 4 μm, at least about 6 μm, at least about 8 μm, at least about 10 μm, or at least about 15 μm) and/or at most about 30 μm (e.g., at most about 25 μm, at most 20 μm, at most about 15 μm, at most about 10 μm, at most about 5 μm, or at most about 2 μm).

Without wishing to be bound by theory, it is believed that the hot melt ink composition described herein can include particles with an average particle diameter larger than those permitted in a conventional ink composition designed for a continuous inkjet printer at least because the net charge for each ink drop formed by the ink composition described herein is substantially zero and therefore a precise breaking-off time of each ink drop is not important. As such, the maximum particle size for the ink composition described herein is believed to be only limited by the nozzle diameter. By contrast, the ink drops produced by a conventional ink composition designed for continuous inkjet printing contain non-zero net charges and the net charge in each ink drop depends on the synchronicity of the square wave of the charging electric field and the break-off time. As such, if a conventional ink composition for continuous inkjet printing contains large particles, the particles would alter the break-off time, thereby resulting in randomly charged drops, which would be projected to random positions after deflection by the electric field and lead to poor printing quality.

Without wishing to be bound by theory, it is believed that the hot melt ink composition described herein can include particles with an average particle diameter larger than those permitted in a conventional ink composition designed for a drop-on-demand inkjet printer. Specifically, a conventional drop-on-demand ink composition is typically stagnant in a reservoir when the ink is not in use. As a result, if such an ink contains particles with large sizes (e.g., those having an average diameter larger than 0.5 μm), the particles can settle in the reservoir, which can form printed ink that does not contain a sufficient amount of particles, clog the nozzles of a printer, or both. By contrast, as the hot melt ink composition described herein is used in a continuous printing process, the continuous printing process keeps the ink moving and mixing constantly, thereby allowing the particles to remain suspended in the printing process.

In some embodiments, the hot melt ink composition has a relatively high melt viscosity. As mentioned herein, the term "melt viscosity" refers to the shear viscosity of an ink composition in its molten state. In some embodiments, the ink composition can have a melt viscosity of at least about 1 centiPoise (cP) (e.g., at least about 5 cP, at least about 10 cP, at least about 15 cP, or at least about 20 cP) and/or at most about 25 cP (e.g., at most about 20 cP, at most about 15 cP, or at most about 10 cP) measured at the intended jetting temperature. For example, the ink composition can have a melt viscosity from about 5 cP to about 25 cP measured at the intended jetting temperature. The jetting temperature for the hot melt ink composition can range from about 80° C. to about 175° C. (e.g., 125° C.). Without wishing to be bound by theory, it is believed that the hot melt ink composition described herein can allow a melt viscosity higher than a conventional ink composition designed for a continuous inkjet printer.

In some embodiments, the hot melt ink composition has a relatively high density. In some embodiments, the ink composition can have a density of at least about 0.8 g/mL (e.g., at least about 1 g/mL, at least about 1.2 g/mL, at least about 1.4 g/mL, or at least about 1.5 g/mL) and/or at most about 2.5 g/mL (e.g., at most about 2.4 g/mL, at most about 2.2 g/mL, or at most about 2 g/mL). Without wishing to be bound by theory, it is believed that the hot melt ink composition described herein can have a density higher than a conventional ink composition designed for a continuous inkjet printer. Specifically, it is believed that, in continuous inkjet printing, high density inks typically cannot be jetted reliably as the electric deflection cannot reliably compensate the relatively large mass of an ink drop. However, in some embodiments, such an issue can be avoided in the hot melt ink composition described herein because the ink drops produced by such an ink composition are not deflected during the printing process. As a result, the hot melt ink composition described herein can form opaque formulations (e.g., white formulations) that contain a large amount of particles or particles with a large size or formulations containing glass frit or metallic particles (e.g., Ag and Zn particles).

In some embodiments, the hot melt ink composition described herein can further include at least one resin, at least one tackifier, at least one plasticizer, at least one antioxidant, and/or at least one dispersant.

In general, the hot melt ink composition can optionally include one or more resins. The resin can provide the ink composition with a desired viscosity, thermal stability, flexibility, and adhesion properties. In some embodiments, the resin can serve as a binder in the hot melt ink composition. Examples of resins include acacia (gum arabic); gum ghatti; guar gum; locust (carob) bean gum; karaya gum (sterculia gum); gum tragacanth; chicle; highly stabilized rosin ester; tall oil; manila copais; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; gualac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene; polymaleic acid; polyoxyethylene derivatives; polypropylene glycol; polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; zanthan gum; and zein.

In general, the hot melt ink composition includes enough resin to achieve the desired viscosity, stability, flexibility, and adhesion. In some embodiments, the ink composition contains at least about 1 wt % (e.g., at least about 5 wt %, at least about 10 wt %, or at least about 15 wt %) and/or at most about 25 wt % (e.g., at most about 20 wt %, at most about 15 wt %, at most about 10 wt %, or at most about 5 wt %) of the resin. In some embodiments, the ink composition contains no resin.

In some embodiments, the hot melt ink composition described herein can optionally include one or more tackifiers. In general, a tackifier can improve adhesion between the ink composition and a substrate (e.g., a cardboard or a film). Examples of tackifiers include glycerol esters, pentaerythritol esters, hydrocarbons, rosin, rosin esters, modified rosin esters (e.g., hydrogenated, acid, or phenolic-modified rosin esters), cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and other synthetic and natural resins. A commercially available tackifier is polyterpene available from Goodyear under the trade name Wingtack 86. In some embodiments, the ink composition contains at least about 1 wt % (e.g., at least about 5 wt %, at least about 10 wt %, or at least about 15 wt %) and/or at most about 25 wt % (e.g., at most about 20 wt %, at most about 15 wt %, at most about 10 wt %, or at most about 5 wt %) of the tackifier.

In some embodiments, the hot melt ink composition described herein can optionally include one or more plasticizers. In general, a plasticizer can increase the flexibility of the ink composition. Examples of plasticizers include aromatic sulfonamides, phthalates, acetates, adipates, amides, azelates, epoxides, glutarates, laurates, oleates, sebacates, stearates, sulfonates, tallates, phosphates, benzoin ethers, and trimellitates. In some embodiments, the ink composition contains at least about 1 wt % (e.g., at least about 2 wt %, at least about 4 wt %, at least about 6 wt %, or at least about 8 wt %) and/or at most about 10 wt % (e.g., at most about 9 wt %, at most about 7 wt %, at most about 5 wt %, or at most about 3 wt %) of the plasticizer.

In some embodiments, the hot melt ink composition described herein can optionally include one or more antioxidants. In general, an antioxidant can inhibit oxidation (e.g., thermally induced oxidation) of the ink composition (e.g., when the ink composition is in a hot molten state during jetting). Examples of antioxidants include butylated hydroxyanisole (BHA); butylated hydoxytoluene (BHT); propyl gallate; tert-butyl hydroquinone (TBHQ); ethylenediaminetetraacetic acid (EDTA); methyl paraben; and propyl paraben. Commercial examples of the antioxidant include Irganox 245 and Irganox 1010 (i.e., hindered phenols) available from BASF Corporation (Florham Park, N.J.). In some embodiments, the ink composition contains at least about 0.1 wt % (e.g., at least about 0.5 wt %, at least about 1 wt %, or at least about 3 wt %) and/or at most about 5 wt % (e.g., at most about 4 wt %, at most about 3 wt %, at most about 2 wt %, or at most about 1 wt %) of the antioxidant.

In some embodiments, the hot melt ink composition described herein can optionally include one or more dispersants. In general, a dispersant can assist in stabilizing an insoluble component (e.g., a colorant) in the hot melt ink composition. For example, the dispersant can prevent agglomeration of a colorant (e.g., a pigment) in the ink composition. Examples of dispersants include Solsperse 13,650, 13,940, 17,000, J910; Byk 108; Tego Dispers 700; UNIQEMA 5543; and EFKA 5244, 5207, 6750; which are all commercially available from Lubrizol; Byk Chemie; Tego Chemie; Croda; and BASF, respectively. In some embodiments, the ink composition contains at least about 1 wt % (e.g., at least about 2 wt %, at least about 4 wt %, at least about 6 wt %, or at least about 8 wt %) and/or at most about 10 wt % (e.g., at most about 9 wt %, at most about 7 wt %, at most about 5 wt %, or at most about 3 wt %) of the dispersant.

The hot melt ink composition described herein can have advantages over conventional ink compositions designed for a continuous inkjet printing process and conventional ink compositions designed for a drop-on-demand printing process. For example, comparing to a conventional ink composition designed for a continuous inkjet printing process, the hot melt ink composition described herein can have improved printing quality, allow a wider range of ingredients and properties while still remaining jettable, allow a larger amount of particles and particles with a larger size, and allow a higher viscosity and density. As another example, comparing to a conventional ink composition designed for a drop-on-demand inkjet printing process, the hot melt ink composition described herein can allow a larger distance between a printhead and a substrate, allow a wider range of ingredients and properties while still remaining jettable, and allow a larger amount of particles and particles with a larger size.

The hot melt ink composition described herein can be used in a continuous printing process for selectively projecting portions of an ink stream onto a substrate to form an image (e.g., a 3-D article). In such a printing process, the hot melt ink composition is typically melted to form a liquid ink, which is jetted from one or more nozzles in a printhead. In some embodiments, the unused ink stream can be deflected by at least one (e.g., one, two, three, four or more) deflection electrode to direct the ink stream to an ink recovery gutter, while the ink used to form an image is not deflected and can be directed to a substrate to form an image. Such a printing process and its related printer have been described in, e.g., U.S. Pat. Nos. 8,540,350; 8,162,450; and 7,192,121 and U.S. Application Publication No. 2013/0307891 and 2014/0168322.

Radiation Curable Ink Composition

In general, the radiation curable ink composition contains at least one radiation curable material and at least one conductive agent.

The radiation curable material generally is a material that contains a curable functional group and can be cured under radiation, such as ultraviolet (UV) light, visible light, infrared (IR) light, or electron beam (E-beam). The radiation material can be a monomer, an oligomer, or a polymer. The radiation curable material can include at least one functional group, such as at least one acrylate group, at least one vinyl group, at least one epoxy group, or a combination thereof. For example, the radiation curable material can be an acrylate material, a vinyl material, or an epoxy material. In some embodiments, the radiation curable material can be monofunctional (i.e., containing one of the above functional groups) or polyfunctional (i.e., containing more than one of the above functional groups and/or other functional groups).

Suitable radiation curable acrylate materials can include esters of acrylic acid (i.e., acrylates) and esters of methacrylic acid (i.e., methacrylates). Specific example include 4-hydroxybutyl acrylate (e.g., those available from San Esters Corp, New York, N.Y.), 2-(2-ethoxyethoxy)ethyl acrylate (e.g., SR256 available from Sartomer Arkema Group, Exton, Pa.), tetrahydrofurfuryl acrylate (e.g., SR285 available from Sartomer Arkema Group, Exton, Pa.), a urethane acrylate oligomer (e.g., CN9029 available from Sartomer Arkema Group, Exton, Pa.), trimethylolpropane triacrylate (e.g., SR351 available from Sartomer Arkema Group, Exton, Pa.), octyl acrylate, decyl acrylate, nonylphenol ethoxylate acrylate, ethyl diglycol acrylate, isobornyl acrylate, ethylhexyl acrylate, lauryl acrylate, butanediol monoacrylate, β-carboxyethyl acrylate, isobutyl acrylate, polypropylene glycol monomethacrylate, 2-hydroxyethyl methacrylate, hexanediol di(meth)acrylate, tetraethylene glycol diacrylate, tripropylene glycol diacrylate, butanediol diacrylate, polyethylene glycol diacrylates, and triethylene glycol dimethacrylate.

Suitable radiation curable vinyl materials can include substituted or unsubstituted styrenes, vinyl ethers, vinyl esters, and vinyl pyrrolidones. Specific example include triethyleneglycol divinyl ether (e.g., DVE-3 available from BASF Corporation, Florham Park, N.J.), 4-hydroxybutyl vinyl ether (e.g., those available from BASF Corporation, Florham Park, N.J.), N-vinylpyrrolidone, and 1,4-cyclohexanedimethanol divinyl ether.

Example of suitable radiation curable epoxy materials include neopentyl glycol diglycidyl ether (e.g., Erisys GE20 available from CVS Specialty Chemicals Inc., Moorestown, N.J.), 2,2'-[ethylenebis(oxymethylene)]bisoxirane (e.g., Erisys EGDGE available from CVS Specialty Chemicals Inc., Moorestown, N.J.), bis-(3,4-epoxycyclohexyl)adipate (e.g., UVR 6128 from Dow Chemical Co., Midland, Mich.), isodecyl glycidyl ether, 1,4-butanediol diglycidylether, and difunctional cycloaliphatic epoxide resins.

Other suitable radiation curable materials have been described in, e.g., U.S. Pat. Nos. 4,303,924, 5,275,646, 5,623,001, and 7,322,688.

In general, the radiation curable ink composition can include an amount of the radiation curable material that is sufficient to form an image. In some embodiments, the ink composition can contain at least about 10 wt % (e.g., at least about 20 wt %, at least about 30 wt %, at least about 40 wt %, or at least about 50 wt %) and/or at most about 99 wt % (e.g., at most about 95 wt %, at most about 90 wt %, at most about 80 wt %, at most about 70 wt %, at most about 60 wt %, or at most about 50 wt %) of the radiation curable material.

In some embodiments, the radiation curable ink composition can optionally further include at least one photoinitiator. The photoinitiator can initiate free-radical curing or cationic curing of the radiation curable material. The photoinitiator can include a ketone, a phosphine oxide, a phosphinate, a sulfonium salt, an iodonium salt, or a mixture thereof. In some embodiments, when the radiation curable ink composition is designed to be cured by E-beam, it may not include any photoinitiator.

Examples of suitable ketone photoinitiators include benzophenone (e.g., Darocur BP available from BASF Corporation, Florham Park, N.J.), α-oxo-benzeneacetic acid methyl ester (e.g., Darocur MBF available from BASF Corporation, Florham Park, N.J.), 2-hydroxy-2-methyl-1-phenyl-1-propanone (e.g., Darocur 1137 available from BASF Corporation, Florham Park, N.J.), 1-hydroxycyclohexyl phenyl-ketone (e.g., Irgacure 184 available from BASF Corporation, Florham Park, N.J.), 2-methyl-1-[4-(methylthio)phenyl]-2-(4-morpholinyl)-1-propanone (e.g., Irgacure 907 available from BASF Corporation, Florham Park, N.J.), isopropylthioxanthone (e.g., Genocure ITX available from Rahn USA Corp., Aurora, Ill.), acrylic ketones, 1-hydroxycyclohexyl phenyl ketone, 2,2-dimethoxy-1,2-diphenylethan-1-one, and p-phenylbenzophenone.

An example of a suitable phosphine oxide photoinitiator is bis(2,4,6-trimethyl benzoyl)phenylphosphine oxide (e.g., Irgacure 819 available from BASF Corporation, Florham Park, N.J.), and diphenyl(2,4,6-trimethylbenzoyl)-phosphine oxide (e.g., Lucirin TPO available from BASF Corporation, Florham Park, N.J.).

An example of a suitable phosphinate photoinitiator is 2,4,6-trimethylbenzoylphenylphosphinic acid ethyl ester (e.g., Lucirin TPO-L available from BASF Corporation, Florham Park, N.J.).

Examples of suitable sulfonium salt photoinitiators include triarylsulfonium hexafluorophosphate salts (e.g., Cyracure UVI-6992 available form Dow Chemical Company, Midland, Mich.).

An example of a suitable iodonium salt photoinitiator is (4-methylphenyl) [4-(2-methylpropyl)phenyl]-hexafluorophosphate iodonium (e.g., Irgacure 250 available from BASF Corporation, Florham Park, N.J.)

In general, the radiation curable ink composition can include an amount of the photoinitiator that is sufficient to initiate the curing reaction of the radiation curable material. In some embodiments, the ink composition can contain at least about 0.1 wt % (e.g., at least about 0.2 wt %, at least about 0.5 wt %, at least about 1 wt %, or at least about 2 wt %) and at most about 10 wt % (e.g., at most about 9 wt %, at most about 8 wt %, at most about 7 wt %, at most about 6 wt %, or at most about 5 wt %) of the photoinitiator.

In general, the radiation curable ink composition can include at least one conductive agent, which can be the same and/or have the same characteristics as the conductive agent used in a hot melt ink composition described above. In some embodiments, the conductive agent can be a salt (e.g., an organic salt or an inorganic salt). For example, the salt can be a quaternary phosphonium salt, a quaternary ammonium salt, an imidazolium salt, or an alkali salt. In some embodiments, the conductive agent is a liquid electrolyte at ambient temperature.

In general, the radiation curable ink composition can include an amount of the conductive agent that is sufficient to produce a dipole under an electric field (e.g., an electrostatic field). In some embodiments, the composition includes at least about 0.05 wt % (e.g., at least about 0.1 wt %, at least about 0.25 wt %, at least about 0.5 wt %, at least about 1 wt %, at least about 1.5 wt %, at least about 2 wt %, at least about 2.5 wt %, or at least about 3 wt %) and/or at most about 5% (e.g., at most about 4.5 wt %, at most about 4 wt %, at most about 3.5 wt %, or at most about 3 wt %) of the conductive agent. Without wishing to be bound by theory, it is believed that the amount of an inorganic salt can be less than the amount of an organic salt to achieve the same conductivity in the radiation curable ink composition.

In some embodiments, the radiation curable ink composition can have a relatively low conductivity measured in its liquid state. For example, the composition can have a conductivity of at most about 1000 μS/cm (e.g., at most about 500 µS/cm, at most about 200 µS/cm, at most about 150 µS/cm, at most about 100 µS/cm, at most about 75 µS/cm, or at most about 50 µS/cm) and/or at least about 5 µS/cm (e.g., at least about 10 µS/cm, at least about 15 µS/cm, at least about 20 µS/cm, or at least about 25 µS/cm) measured in a liquid state. Without wishing to be bound by theory, it is believed that the conductivity of the radiation curable ink composition can depend on the polarity of the other ingredients (e.g., a radiation curable material or a wax) in the composition. For example, it is believed that a radiation curable ink composition having a more polar ingredient (e.g., a more polar radiation curable material) can have a higher conductivity compared to a radiation curable composition having the same amount of a less polar ingredient (e.g., a less polar radiation curable material). As another example, it is believed that a radiation curable ink composition having a larger amount of a polar ingredient can have a higher conductivity compared to a radiation curable composition having a smaller amount of the same ingredient.

Without wishing to be bound by theory, it is believed that the radiation curable ink composition described herein can have a lower conductivity than a conventional ink composition designed for a continuous inkjet printer at least because the radiation curable ink composition described herein does not need to generate net electric charges during the printing process. As such, the radiation curable ink composition described herein does not need to include a large amount of the conductive agent, thereby allowing the composition to include a wide range of ingredients and remains jettable in a wide range of viscosities. In addition, without wishing to be bound by theory, it is believed that the radiation curable ink composition described herein can have a higher conductivity than a conventional ink composition designed for a drop-on-demand printer (which is typically an insulator and has no conductivity) at least because the radiation curable ink composition described herein needs to include a certain amount of a conductive agent so that the composition can produce a dipole under an electric field, which allows unused ink to be deflected by one or more deflection electrodes into an ink recovery gutter.

In some embodiments, the radiation curable ink composition can have substantially no net electric charge (i.e., substantially zero net electric charge) in an ink stream or ink drops during the printing process. By contrast, a conventional ink composition for a continuous inkjet printer typically has a relatively large amount net electric charges to perform the printing process.

In general, the radiation curable ink composition can optionally include at least one colorant, such as a dye or a pigment. The colorant can be the same and/or have the same characteristics as the colorant used in the hot melt ink composition described above. In some embodiments, when the ink composition is used to print a transparent image (e.g., a transparent 3-D article), the ink composition may not include a colorant.

In some embodiments, the radiation curable ink composition can include at least about 0.1 wt % (e.g., at least about 0.5 wt %, at least about 1 wt %, at least about 2 wt %, at least about 5 wt %, at least about 10 wt %, or at least about 15 wt %) and/or at most about 25 wt % (e.g., at most about 20 wt %, at most about 15 wt %, at most about 10 wt %, at most about 5 wt %, at most about 2 wt %, or at most about 1 wt %) of the colorant.

In general, the radiation curable ink composition can optionally include at least one solvent, such as an organic solvent, water, or a mixture thereof. The organic solvent can be an alcohol (e.g., methanol, ethanol, or isopropyl alcohol), a ketone (e.g., methyl ethyl ketone), an ether (e.g., ethylene glycol monomethyl ether), or an ester (e.g., ethyl acetate). In some embodiments, the radiation curable material can serve as a solvent to dissolve or disperse the other ingredients in the composition. In such embodiments, the ink composition may not include a solvent.

In some embodiments, the radiation curable ink composition can include an amount of the solvent that is sufficient to dissolve or disperse the other ingredients in the composition. For example, the radiation curable ink composition can include at least about 1 wt % (e.g., at least about 5 wt %, at least about 10 wt %, at least about 20 wt %, at least about 30 wt %, at least about 40 wt %, or at least about 50 wt %) and/or at most about 80 wt % (e.g., at most about 70 wt %, at most about 60 wt %, at most about 50 wt %, at most about 40 wt %, at most about 30 wt %, or at most about 20 wt %) of the solvent.

In some embodiments, the radiation curable ink composition can include at least one wax, which can serve as a gellant. The wax can be the same and/or have the same characteristics as the wax used in the hot melt ink composition described above. For example, the wax can be an amide alcohol wax, a C6-C58 primary alcohol wax, a C6-C58 carboxylic acid wax, a urethane wax, an ether wax, or an ester wax.

In some embodiments, the radiation curable ink composition can include at least one reactive wax, such as a wax containing at least one radiation curable group (e.g., an acrylate group, a vinyl group, an epoxy group, or a combination thereof). Examples of such reactive waxes include acrylate waxes (i.e., waxes containing at least one acrylate group), vinyl waxes (i.e., waxes containing at least one vinyl group), and epoxy waxes (i.e., waxes containing at least one epoxy group).

In some embodiments, the radiation curable ink composition can optionally include an amount of a wax that is sufficient to form a semi-solid when the ink is printed on a substrate at ambient temperature. In some embodiments, the radiation curable ink composition can include at least about 1 wt % (e.g., at least about 2 wt %, at least about 5 wt %, at least about 10 wt %, at least about 15 wt %, at least about 20 wt %, or at least about 25 wt %) and/or at most about 50 wt % (e.g., at most about 45 wt %, at most about 40 wt %, at most about 35 wt %, at most about 30 wt %, at most about 25 wt %, or at most about 20 wt %) of the wax.

In general, a radiation curable ink composition containing a wax or a gellant can have the advantages of both a radiation curable ink composition and a hot melt ink composition. In some embodiments, such an ink composition is typically jetted at an elevated temperature (e.g., from about 25° C. to about 175° C.) to melt the wax and lower the ink viscosity. In such embodiments, when such an ink composition is printed on a substrate, the ink can freeze to form a semi-solid and stay fixed on the substrate until it is exposed to radiation (e.g., UV light) and cured. A radiation curable ink composition without a wax typically has a relatively low viscosity, and would need to be cured in a relatively short amount of time after it is jetted onto a substrate so that the ink dots do not continue to flow into one another. Comparing to such an ink composition, a radiation curable ink composition containing a wax or a gellant has an advantage that it permits a relatively long delay between jetting and curing.

In some embodiments, the radiation curable ink composition can optionally include particles. The particles can be the same and/or have the same characteristics as the particles used in the hot melt ink composition described above. For example, the particles can be colorants (e.g., dispersed dyes or pigments) or other components in the ink composition. The particles can be suspended in the radiation curable ink composition.

Without wishing to be bound by theory, it is believed that the radiation curable ink composition described herein can include particles with an average particle diameter larger than those permitted in a conventional ink composition designed for a continuous inkjet printer and those permitted in a conventional ink composition designed for a drop-on-demand inkjet printer for the same reasons set forth above with respect to the hot melt ink composition.

In some embodiments, the radiation curable ink composition has a relatively high viscosity in a liquid state (e.g., a relatively high melt viscosity in a melted state if the ink composition is a solid or semi-solid at ambient temperature). In some embodiments, the ink composition can have a viscosity of at least about 1 centiPoise (cP) (e.g., at least about 5 cP, at least about 10 cP, at least about 15 cP, or at least about 20 cP) and/or at most about 25 cP (e.g., at most about 20 cP, at most about 15 cP, or at most about 10 cP) measured at the intended jetting temperature. The jetting temperature for the radiation curable ink composition can range from about 25° C. to about 125° C. For example, the ink composition can have a viscosity from about 5 cP to about 25 cP measured at the intended jetting temperature. Without wishing to be bound by theory, it is believed that the radiation curable ink composition described herein can allow a viscosity higher than a conventional ink composition designed for a continuous inkjet printer.

In some embodiments, the radiation curable ink composition has a relatively high density. In some embodiments, the ink composition can have a density of at least about 0.8 g/mL (e.g., at least about 1 g/mL, at least about 1.2 g/mL, at least about 1.4 g/mL, or at least about 1.5 g/mL) and/or at most about 2.5 g/mL (e.g., at most about 2.4 g/mL, at most about 2.2 g/mL, or at most about 2 g/mL). Without wishing to be bound by theory, it is believed that the radiation curable ink composition described herein can have a density higher than a conventional ink composition designed for a continuous inkjet printer. Specifically, it is believed that, in continuous inkjet printing, high density inks typically cannot be reliably jetted as the electric deflection cannot reliably compensate the relatively large mass of an ink drop. However, in some embodiments, such an issue can be avoided in the radiation curable ink composition described herein because the ink drops produced by such an ink composition are not deflected during the printing process. As a result, the radiation curable ink composition described herein can form opaque formulations (e.g., white formulations) that contain a large amount of particles or particles with a large size or formulations containing glass frit or metallic particles (e.g., Ag and Zn particles).

In some embodiments, the radiation curable ink composition described herein can further include at least one surfactant, at least one polymerization inhibitor, at least one antioxidant, or at least one dispersant.

In some embodiments, the radiation curable ink composition can optionally include at least one antioxidant or at least one dispersant. The antioxidant and dispersant can be the same, have the same characteristics, and/or be in the same amounts, as those used in the hot melt ink composition described above.

In some embodiments, the radiation curable ink composition can optionally include one or more surfactants. In general, the surfactant can serve to alter the surface tension of the ink composition. The surfactant can be an anionic, cationic, nonionic or amphoteric surfactant, such as those described in *McCutcheon's Functional Materials*, North American Edition, Manufacturing Confectioner Publishing Co., Glen Rock, N.J., pp. 110-129 (1990). Examples of surfactants include copolymers such as SILWET (e.g., SILWET L-7604, available from Crompton, OSi Specialties division). Such copolymers generally include ethylene oxide, propylene oxide, and/or silicone units. Other examples of surfactants include 3M FC430 available from 3M of St. Paul, Minn. and F50-100 available from DuPont Chemicals of Wilmington, Del. In some embodiments, the radiation curable ink composition can include at least about 0.05 wt % (e.g., at least about 0.1 wt %, at least about 0.2 wt %, at least about 0.5 wt %, at least about 1 wt %, or at least about 2 wt %) and/or at most about 5 wt % (e.g., at most about 4 wt %, at most about 3 wt %, at most about 2 wt %, at most about 1 wt %, or at most about 0.5 wt %) of the surfactant.

In some embodiments, the radiation curable ink composition described herein can optionally include one or more polymerization inhibitors. In some embodiments, the polymerization inhibitor can include a free radical polymerization inhibitor or a cationic polymerization inhibitor. In general, the free radical polymerization inhibitor can stabilize any free radical monomers in the ink composition by removing free radicals. Examples of free radical polymerization inhibitors include phenols (e.g., p-hydroxyanisole and hydroquinone), thiols, and amines (e.g., N-alkyl and N-aryl anilines, N,N'-dinitroso phenylenediamines), and xanthates. In general, the cationic polymerization inhibitor can stabilize any cationic monomers in the ink composition by removing free cations. Examples of cationic polymerization inhibitors include weak bases including amines such as secondary or tertiary amines (e.g. triethanolamine or decyldimethylamine), and a mixture of Copper(II) 2-ethyl hexanoate, dodecyl sulfide, and Irganox 1010.

In some embodiments, the radiation curable ink composition can include at least about 0.05 wt % (e.g., at least about 0.1 wt %, at least about 0.2 wt %, at least about 0.3 wt %, at least about 0.4 wt %, or at least about 0.5 wt %) and/or at most about 2 wt % (e.g., at most about 1.5 wt %, at most about 1 wt %, at most about 0.5 wt %, at most about 0.4 wt %, or at most about 0.3 wt %) of the polymerization inhibitor.

The radiation curable ink composition described herein can have advantages over conventional ink compositions designed for a continuous inkjet printing process and conventional ink compositions designed for a drop-on-demand printing process. For example, comparing to a conventional ink composition designed for a continuous inkjet printing process, the radiation curable ink composition described herein can have improved printing quality, allow a wider range of ingredients and properties while still remaining jettable, allow a larger amount of particles and particles with a larger size, and allow a higher viscosity and density. As another example, comparing to a conventional ink composition designed for a drop-on-demand inkjet printing process, the radiation curable ink composition described herein can allow a larger distance between a printhead and a substrate, allow a wider range of ingredients and properties while still remaining jettable, and allow a larger amount of particles and particles with a larger size.

Printing Processes and Products

In general, the ink compositions described herein can be used in a printing process that includes ejecting an ink composition from a printhead in an ink jet printer continuously to form an ink stream. The ink stream can have substantially no net electric charge. In embodiments when a hot melt ink composition is used, the printing process can further include melting the hot melt ink composition in the printhead prior to ejecting the hot melt ink composition.

In some embodiments, the ink stream ejected from the printhead can be deflected by at least one (e.g., two, three, four or more) deflection electrode to direct the ink stream to an ink recovery gutter. In such embodiments, the process can further include forming ink drops that are substantially not deflected by the deflection electrode and directing the ink drops that are substantially not deflected to a substrate to form an image.

In some embodiments, the principle of the printing process described in the preceding paragraph can be summarized as follows: a continuous ink stream ejected from a printhead is deviated by at least one electrode to which a static or sinusoidal high voltage is applied. Most of the ink stream is not printed and is directed to an ink recovery gutter. During printing, segments of the ink stream are sampled asynchronously, deviated differently depending on their length (the length providing a means of varying the distribution of embedded electrical charge per unit length) and directed towards the substrate. These segments, which can be transformed into spherical drops under the effect of the surface tension, are separated from the jet before they are deflected such that their trajectory is different from the ink stream.

Figure 1B:
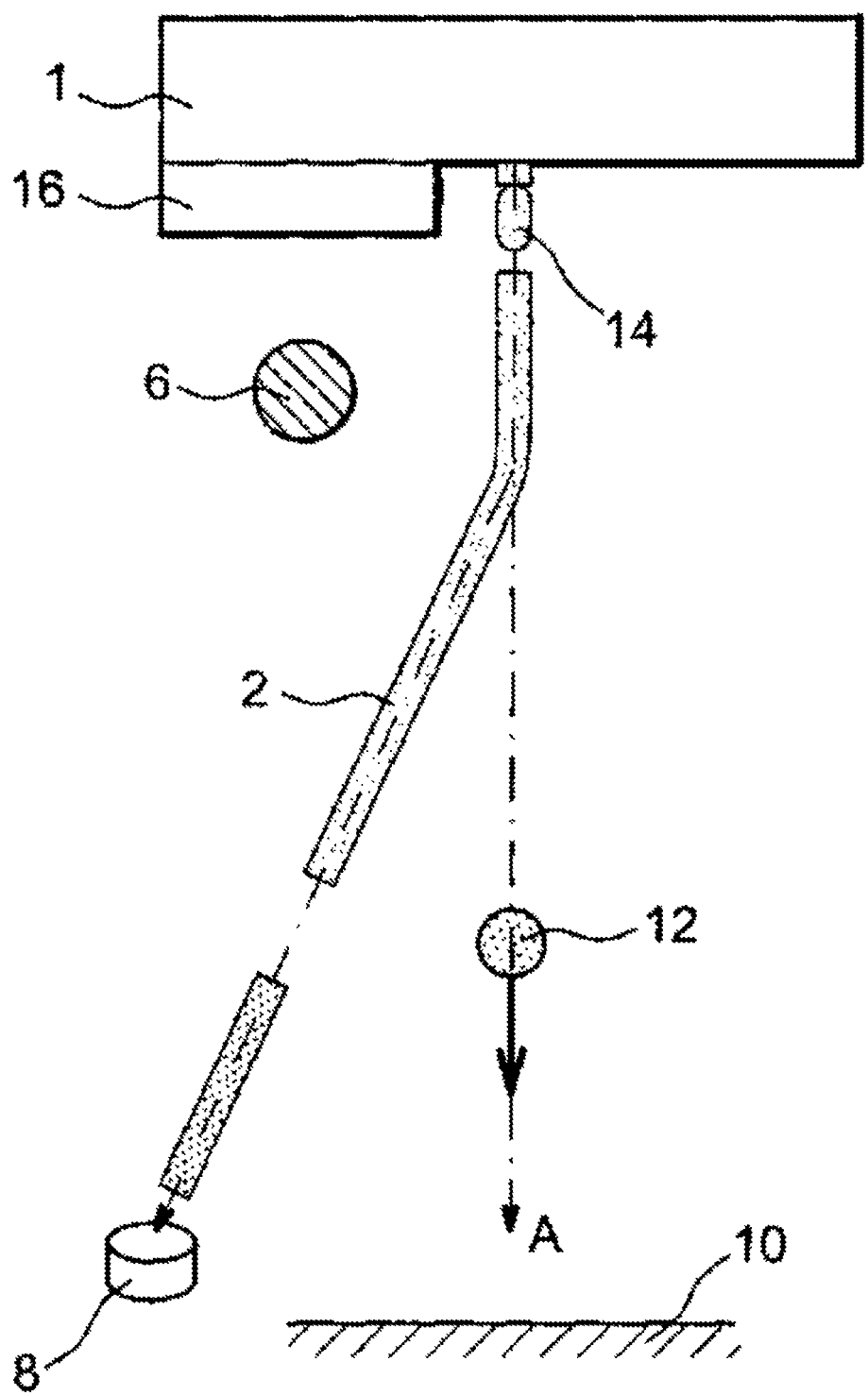

FIGS. 1A and 1B further illustrate the principle of the printing process described above. In particular, FIG. 1A illustrates a non-printing situation and FIG. 1B illustrates a printing situation, As shown in FIG. 1A, in the non-printing situation, a drop generator 1, which is, for example, activated by a piezoelectric device, forms a continuous ink stream 2 along a hydraulic trajectory. The ink stream 2 discharged by the nozzle 4 of the generator 1 at a predetermined speed is deflected from the axis A of the nozzle 4, namely the hydraulic trajectory, by an electric field E. The electric field E can be created by an electrode 6, which can include one or more deflection electrodes.

The electrode 6, which can be preferably brought to a high potential, can form a capacitor with the ink stream 2 such that the attractive force between the ink stream 2 and the electrode 6 is primarily dependent on the potential squared difference and on the distance between the ink stream 2 and the electrode 6. The trajectory of the ink stream 2 is therefore modified. On the downstream side of the electrode 6, the ink stream 2 continues its trajectory along the tangent to its trajectory A at the output from the zone of the electric field E and is directed along a deviated trajectory B towards an ink recovery gutter 8. Based on the speed of the ink stream 2, it is possible to determine the angle between the deflected trajectory B and the hydraulic trajectory A, as well as the length of the printhead or the distance between the nozzle 4 and the gutter 8.

As shown in FIG. 1B, in a printing situation, the printing of an ink drop 12 on a substrate 10 requires the ink stream 2 to be broken twice so as to form a segment of liquid 14 which will form, by way of surface tension, the drop 12. The segment 14 is typically short and unaffected by the electric field E. Preferably, it is not subjected to the deflection by the electrode 6 and the break up point of the ink stream 2 is located at the level of a shield. For example, an electrode 16 can be brought to the same potential as the liquid and the nozzle 4, which shields the break up point from the electric field E produced by the deflecting electrode 6, so that the electric charge borne by the short segment 14 is zero, or very low. Consequently, the segment 14 is not, or is very slightly, deflected when it passes in front of the deflecting electrode 6, and its trajectory is close to the hydraulic trajectory A of the ink stream 2 being discharged from the nozzle 4. The formed segment 14 and the resulting drop 12, therefore, are not intercepted by the ink collection gutter 8, but can be directed to a substrate 10 to be printed.

In some embodiments, the printing process can further include forming ink drops that are substantially not deflected by at least one deflection electrode and directing the ink drops to an ink recovery gutter. In some embodiments, the printing process can further include deflecting the ink stream by at least one deflection electrode to a substrate to form an image. For example, such a printing process can be used to print an image (e.g., a 3D image or a 2D image on a cardboard) that requires a large amount of inks.

The ink compositions described herein can be used with a continuous inkjet printer (e.g., a hot melt or liquid ink continuous inkjet printer) that deflects an ink stream by an electric field into an ink recovery gutter and projecting un-deflected ink segments to a substrate to form an image.

This disclosure also features a product that includes a substrate and a solid ink defining an image on the substrate, in which the solid ink includes one of the ink compositions described herein. The substrate can be any suitable materials (e.g., porous or non-porous materials), such as films, coated papers, plastics, metals, and cardboards. In some embodiments, the substrate can be a package material, such as a cardboard (e.g., a corrugated cardboard) or a film (e.g., a shrink wrap).

In some embodiments, the printing process described herein can be a 3D printing process. In such embodiments, the image printed by this process can be a 3D article. In some embodiments, the ink compositions described herein can omit a colorant to print a transparent 3D article.

The contents of all publications cited herein (e.g., patents, patent application publications, and articles) are hereby incorporated by reference in their entirety.

The following examples are illustrative and not intended to be limiting.

Example 1: Preparation of a Conductive Hot Melt Composition and its Testing in a Continuous Inkjet Printing Process A conductive hot melt composition was prepared as follows: Solid lauryl monoethanolamide (LMA; 99 parts) and solid Irganox 245 (1 part) were heated to 120° C. in a mixing vessel. Once the mixture reached the molten state, agitation was applied. The mixture was agitated at 120° C. for one hour, filtered through a 1 μm glass fiber filter, poured into a mold that hold approximately 100 g of the material, and allowed to cool to form a conductive hot melt composition.

The conductivity of the hot melt composition in the molten state was determined by using an Omega CDB-387 conductivity meter having a CDE-5001-GD1 glass probe in the following manner: Approximately 70 g of material in a 100 mL beaker was heated to 120° C. The conductivity probe was submerged into the molten fluid. After 10 minutes, a conductivity reading of 70-200 μS/cm was recorded (depending on the manufacturer and/or the batch number of LMA). The conductivity of the hot melt composition was resulted from residual sodium methoxide in lauryl monoethanolamide, which was determined by elemental analysis to contain about 0.07-0.25 wt % of sodium methoxide. As the conductivity above was believed to be sufficient, the hot melt composition was used in connection with the continuous inkjet printer described below without adding any additional conductive agent.

Melt viscosity of the hot melt composition was measured by using a Brookfield viscometer (Model DVII) with an attached thermal cell. During measurement, 8.0 grams of the composition was heated in the thermal cell. A #18 spindle running at 60 RPM was used to take viscosity measurement after shearing for 10 minutes minimum. The melt viscosity of the hot melt composition was determined to be 7.7 cP at 125° C.

A lab scale version of a heated continuous printer able to accommodate hot melt inks was designed and utilized to demonstrate the printing process described herein. Major components of the lab scale printer included a 300 mL ink reservoir, a valve manifold, a droplet generator with 50 μm diameter nozzles, a four trace deflection electrode, and an ink recovery gutter. All components were equipped with heating capability. An equilibrium operating temperature of 125° C. was used for all testing. The heated ink reservoir was pressurized with compressed air to force the ink through the system and out of the nozzles. The pressure was set to maintain an ink stream velocity of 14 m/s.

The hot melt composition prepared above was tested in the above printer. The viscosity of the composition necessitated a reservoir pressure of 4.64 bar to achieve jet velocity of 14 m/s+/−0.05 m/s. Pressure was maintained between 4.60 and 4.67 bar during the test period.

Deflection of a continuous hot melt composition stream was demonstrated. During the deflection tests, the distance between the deflection electrode and the composition stream was set to approximately 100 μm. Deflection of the composition stream into the ink recovery gutter was observed upon activation of the deflection electrode.

Formation of droplets and separation of the droplets from the composition stream were observed visually using the following two approaches.

(1) Three composition streams were actuated at 28 kHz with a pulse width of 24 μs. The electrode setting was approximately 500 Vrms. Droplets formed from the three actuated streams were observed beyond the area of the gutter, while the non-actuated composition streams (or sections in the composition stream between the droplets) were deflected into the ink recovery gutter.

(2) Three composition streams were actuated at 4 kHz with a pulse width at 38 μs. The electrode setting was approximately 500 Vrms. Droplets formed from the three actuated streams were observed beyond the area of the gutter, while the non-actuated composition streams (or sections in the ink streams between the droplets) were deflected into the ink recover gutter.

Example 2: Preparation of Conductive Hot Melt Ink Compositions

Hot melt inks 1-8 ("Inks 1-8") were prepared using the following method: Materials to make the inks were mixed and heated to 120° C. in a mixing vessel. Once the mixture reached the molten state, agitation was applied. Each composition was agitated at 120° C. for one hour, filtered through a 1 μm glass fiber filter, poured into a mold that hold approximately 100 g of the material, and allowed to cool to form a conductive ink. The compositions of the Inks 1-8 are summarized in Table 1 below.

TABLE 1

|  | Wax 1 (wt %) | Wax 2 (wt %) | Conductive agent (wt %) | Resin (wt %) | Plasticizer (wt %) | Anti-oxidant (wt %) | Dye (wt %) |
| --- | --- | --- | --- | --- | --- | --- | --- |
| Ink 1 | LMA (43.56) | Unilin 350 (43.56) | Cyphos IL 106 (2.17) | Uni-Rez 2982 (8.93) | None | Irganox 1010 (0.89) | Unisol Blue 2583 (0.89) |
| Ink 2 | LMA (43.56) | Unilin 350 (43.56) | Cyphos IL 106 (2.17) | Foral 85 (8.93) | None | Irganox 1010 (0.89) | Unisol Blue 2583 (0.89) |
| Ink 3 | LMA (43.56) | Unilin 350 (43.56) | Cyphos IL 106 (2.17) | Uni-Rez 2974 (8.93) | None | Irganox 1010 (0.89) | Unisol Blue 2583 (0.89) |
| Ink 4 | LMA (43.56) | Unilin 350 (43.56) | Cyphos IL 106 (2.17) | Foral AX (8.93) | None | Irganox 1010 (0.89) | Unisol Blue 2583 (0.89) |
| Ink 5 | LMA (49.50) | Unicid 350 (29.70) | None | None | Uniplex 214 (19.80) | None | Unisol Blue 2583 (1.00) |
| Ink 6 | LMA (44.55) | Unicid 350 (34.65) | Cyphos IL 106 (0.25) | None | Uniplex 214 (19.55) | None | Unisol Blue 2583 (1.00) |
| Ink 7 | LMA (35.64) | Unithox 420 (21.78) | Cyphos IL 106 (0.50) | Uni-Rez 2982 (17.82) | Uniplex 214 (23.27) | None | Unisol Blue 2583 (1.00) |
| Ink 8 | LMA (36.63) | Unithox 420 (22.77) | Cyphos IL 106 (0.25) | Uni-Rez 2974 (15.84) | Uniplex 214 (23.51) | None | Unisol Blue 2583 (1.00) |

In Table 1, LMA is lauryl monoethanolamide purchased from Phoenix Chemical, Inc. (Somerville, N.J.), which contained about 0.07-0.25 wt % of sodium methoxide. Unilin 350, Unicid 350, and Unithox 420 were purchased from Baker Hughes (Houston, Tex.). Uniplex 214 was purchased from Unitex Chemical Corporation (Greensboro, N.C.). Cyphos IL 106 was purchased from Cytex Industries, Inc. (Woodland Park, N.J.). Uni-Rez 2982 and Uni-Rez 2974 were purchased from Arizona Chemical Company (Savannah, Ga.). Foral 85 and Foral AX were purchased from Pinova Inc. (Brunswick, Ga.). Irganox 1010 was purchased from BASF (Florham Park, N.J.). Unisol Blue 2583 was purchased from United Color Manufacturing, Inc. (Newton, Pa.). All ingredients were used as received.

The thermal stability of Inks 1-8 were tested by place samples into a 120° C. oven. The melt viscosity and conductivity of the samples were measured using the methods described in Example 1 after one week and four weeks. The results are summarized in Tables 2 and 3 below.

TABLE 2

|  | Initial Viscosity (cP) | Viscosity after 1 week (cP) | Viscosity after 4 weeks (cP) |
| --- | --- | --- | --- |
| Ink 1 | 8.35 | 8.05 | 9.2 |
| Ink 2 | 8 | 8.15 | 8.6 |

TABLE 2-continued

|  | Initial Viscosity (cP) | Viscosity after 1 week (cP) | Viscosity after 4 weeks (cP) |
|---|---|---|---|
| Ink 3 | 9.7 | 8.95 | 9.75 |
| Ink 4 | 7.75 | 7.95 | 8.35 |
| Ink 5 | 8.35 | 8.2 | 8.45 |
| Ink 6 | 8.15 | 8.15 | 8.8 |
| Ink 7 | 10.1 | 10.4 | 10.2 |
| Ink 8 | 10.8 | 11.1 | 11.2 |

TABLE 3

|  | Initial conductivity (μS/cm) | Conductivity after 1 week (μS/cm) | Conductivity after 4 weeks (μS/cm) |
|---|---|---|---|
| Ink 1 | 123.9 | 110 | 81.3 |
| Ink 2 | 124 | 104.8 | 78.3 |
| Ink 3 | 137.6 | 120.2 | 102 |
| Ink 4 | 114.7 | 103.4 | 63.5 |
| Ink 5 | 68.4 | 46.6 | 43.6 |
| Ink 6 | 64.8 | 47.3 | 43.8 |
| Ink 7 | 71.9 | 64.4 | 72.1 |
| Ink 8 | 69.6 | 59.7 | 60.6 |

The results show that Inks 1-8 maintained their melt viscosity after being thermally treated at 120° C. for four weeks. In addition, although the conductivity values of Inks 1-8 decreased after being thermally treated at 120° C. for four weeks, they were still within an acceptable range (e.g., more than 5 μS/cm). Thus, this decrease was not expected to affect the performance of these inks in the printing process described herein.

Example 3: Preparation of Conductive UV Curable Ink Compositions

UV curable inks or their precursors without a photoinitiator and/or a dye ("Inks 1-22") were prepared by mixing the ingredients for each ink in a glass beaker using a magnetic stir bar. To cure the ink, a ink composition was first coated onto a glass slide using 0.25 mil. drawdown bar to form a film. Inks containing a wax were placed into a 65° C. oven to melt the wax before coating. The film was then cured on a Fusion UV curing system at 7.5 fpm using a H bulb. The compositions of the Inks 1-22 are summarized in Table 4 below.

TABLE 4

|  | UV curable material #1 (wt %) | UV curable material #2 (wt %) | UV curable material #3 (wt %) | Conductive Agent (wt %) | Wax (wt %) | Photoinitiator #1 (wt %) | Photoinitiator #2 (wt %) | Dye (wt %) | Solvent (wt %) |
|---|---|---|---|---|---|---|---|---|---|
| Ink 1 | 4-hydroxybutyl acrylate (50%) | SR256 (49%) | none | potassium thiocyanate (1%) | none | none | none | none | none |
| Ink 2 | triethyleneglycol divinyl ether (50%) | 4-hydroxybutyl vinyl ether (49%) | none | potassium thiocyanate (1%) | none | none | none | none | none |
| Ink 3 | Erisys GE20 (50%) | Erisys EGDGE (49%) | none | tetrabutylammonium hexafluorophosphate (1%) | none | none | none | none | none |
| Ink 4 | 4-hydroxybutyl acrylate (50%) | 4-hydroxybutyl vinyl ether (49%) | none | lithium nitrate (1%) | none | none | none | none | none |
| Ink 5 | SR285 (50%) | Erisys EGDGE (49%) | none | tetrabutylammonium hexafluorophosphate (1%) | none | none | none | none | none |
| Ink 6 | Erisys EGDGE (50%) | 4-hydroxybutyl vinyl ether (49%) | none | lithium nitrate (1%) | none | none | none | none | none |
| Ink 7 | 4-hydroxybutyl acrylate (94.75%) | none | none | potassium thiocyanate (0.25%) | EGDS (5%) | none | none | none | none |
| Ink 8 | 4-hydroxybutyl vinyl ether (94%) | none | none | lithium nitrate (1%) | LMM (5%) | none | none | none | none |
| Ink 9 | Erisys EGDGE (94%) | none | none | tetrabutylammonium hexafluorophosphate (1%) | EGDS (5%) | none | none | none | none |
| Ink 10 | Erisys GE20 (47%) | triethyleneglycol divinyl ether (47%) | none | tetrabutylammonium hexafluorophosphate (1%) | LMM (5%) | none | none | none | none |
| Ink 11 | Erisys EGDGE (47%) | 4-hydroxybutyl vinyl ether (47%) | none | tetrabutylammonium hexafluorophosphate (1%) | EGDS (5%) | none | none | none | none |
| Ink 12 | Erisys EGDGE (47%) | SR256 (47%) | none | tetrabutylammonium hexafluorophosphate (1%) | LMM (5%) | none | none | none | none |
| Ink 13 | 4-hydroxybutyl acrylate (47.12%) | 4-hydroxybutyl vinyl ether (47.12%) | none | lithium nitrate (0.96%) | EGDS (4.81) | none | none | none | none |
| Ink 14 | CN 9029 (50%) | none | none | tetrabutylammonium hexafluorophosphate (0.5%) | none | none | none | none | MEK (49.5%) |

TABLE 4-continued

| | UV curable material #1 (wt %) | UV curable material #2 (wt %) | UV curable material #3 (wt %) | Conductive Agent (wt %) | Wax (wt %) | Photo-initiator #1 (wt %) | Photo-initiator #2 (wt %) | Dye (wt %) | Solvent (wt %) |
|---|---|---|---|---|---|---|---|---|---|
| Ink 15 | SR351 (25%) | 4-hydroxybutyl acrylate (33.66%) | SR256 (33.32%) | potassium thiocyanate (0.5%) | none | Irgacure 907 (1.92%) | Darocur 4265 (5.6%) | none | none |
| Ink 16 | triethyleneglycol divinylether (71.105) | 4-hydroxybutyl vinylether (17.4%) | none | potassium thiocyanate (0.5%) | none | UVI 6974 (10%) | none | Vailfast Black 3877 (1%) | none |
| Ink 17 | Erisys GE20 (45.98%) | Erisys EGDGE (45.52%) | none | tetrabutylammonium hexafluorophosphate (0.5%) | none | UVI 6974 (8%) | none | none | none |
| Ink 18 | triethyleneglycol divinyl ether (43.83%) | 4-hydroxybutyl acrylate (43.82%) | none | potassium thiocyanate (1%) | EGDS (5%) | Irgacure 907 (1.86%) | Darocur 4265 (5.49%) | none | none |
| Ink 19 | SR351 (24.52%) | 4-hydroxybutyl vinyl ether (33.01%) | SR256 (32.66%) | potassium thiocyanate (0.49%) | none | Irgacure 907 (1.86%) | Darocur 4265 (5.49%) | Valifast Black 3877 (1.96%) | none |
| Ink 20 | Erisys GE20 (45.48%) | Erisys EGDGE (45.02%) | none | tetrabutylammonium hexafluorophosphate (0.5%) | none | UVI 6974 (8%) | none | Vailfast Black 3877 (1%) | none |
| Ink 21 | Erisys EGDGE (42.88%) | 4-hydroxybutyl vinylether (42.88%) | none | tetrabutylammonium hexafluorophosphate (0.25%) | EGDS (5%) | UVI 6974 (8%) | none | Vailfast Black 3877 (1%) | none |
| Ink 22 | Erisys EGDGE (42.75%) | triethyleneglycol divinylether (42.75) | none | tetrabutylammonium hexafluorophosphate (0.5%) | EGDS (5%) | UVI 6974 (8%) | none | Vailfast Black 3877 (1%) | none |

In Table 4,4-hydroxybutyl acrylate was purchased from San Esters Corp. (New York, N.Y.). SR256 is 2-(2-ethoxyethoxy)ethyl acrylate purchased from Sartomer Arkema Group (Exton, Pa.). Triethyleneglycol divinyl ether and 4-hydroxybutyl vinyl ether were purchased from BASF Corporation (Florham Park, N.J.). Erisys GE20 is neopentyl glycol diglycidyl ether purchased from CVC Specialty Chemicals Inc. (Moorestown, N.J.). Erisys EGDGE is 2,2'-[ethylenebis(oxymethylene)]bisoxirane purchased from CVC Specialty Chemicals Inc. (Moorestown, N.J.). SR285 is tetrahydrofurfuryl acrylate purchased from Sartomer Arkema Group (Exton, Pa.). CN9029 is a urethane acrylate oligomer purchased from Sartomer Arkema Group (Exton, Pa.). SR351 is trimethylolpropane triacrylate purchased from Sartomer Arkema Group (Exton, Pa.). Potassium thiocyanate was purchased from GFS Chemicals, Inc. (Powell, Ohio). Tetrabutylammonium hexafluorophosphate was purchased from Sigma Aldrich (St. Louis, Mo.). Lithium nitrate was purchased from Merck KGaA (Darmstadt, Germany). LMM is lauryl monoethanolamide purchased from Solvay USA Inc., (Cranbury, N.J.). EDGS is ethylene glycol distearate purchased from Solvay USA Inc., (Cranbury, N.J.). Irgacure 907 is 2-methyl-1-[4-(methylthio)phenyl]-2-(4-morpholinyl)-1-propanone purchased from BASF Corporation (Florham Park, N.J.). Darocur 4265 was purchased from BASF Corporation (Florham Park, N.J.), and contains 50% 2,4,6-trimethylbenzoyl-diphenyl-phosphineoxide and 50% 2-hydroxy-2-methyl-1-phenyl-propan-1-one (Darocur 1173). UVI 6974 was purchased from The Dow Chemical Company (Piscataway, N.J.), and contained (1) (thiodi-4,1-phenylene)bis[diphenyl-bis[(OC-6-11)hexafluoroantimonate(1-)]sulfonium, (2) p-thiophenoxyphenyldiphenylsulfonium hexafluoroantimonate, and (3) propylene carbonate. All ingredients were used as received.

The viscosity and conductivity of Inks 1-22 were measured using the instruments and methods described in Example 1 with minor modifications. Specifically, the viscosity of Inks 1-22 was measured at different temperatures as shown in Table 5 below. The conductivity of liquid compositions was measured at room temperature by inserting the conductivity probe into the liquid for 2 minutes until readings were stabilized. To measure the conductivity of ink compositions containing a wax, the ink compositions were placed into a 67° C. oven in an aluminum block made for scintillation vials. After the compositions were melted, the aluminum block and the composition were placed on a hot plate heated to 100° C. The conductivity probe was then placed into the heated liquid for 2 minutes until the measurement was stabilized. The results of these measurements are summarized in Table 5.

TABLE 5

| | Viscosity (cP) | Conductivity (μS/cm) |
|---|---|---|
| Ink 1 | 4.44 (at 40° C.) | 176.7 |
| Ink 2 | 3.21 (at 40° C.) | 320 |
| Ink 3 | 10.9 (at 40° C.) | 37.2 |
| Ink 4 | 5.82 (at 40° C.) | 112.7 |
| Ink 5 | 5.19 (at 40° C.) | 69 |
| Ink 6 | 6.25 (at 40° C.) | 92 |
| Ink 7 | 24.9 (at 60° C.) | 120 |
| Ink 8 | 3.45 (at 50° C.) | 180 |
| Ink 9 | 8.15 (at 70° C.) | 243 |
| Ink 10 | 6.9 (at 45° C.) | 127 |
| Ink 11 | 7.2 (at 60° C.) | 260 |
| Ink 12 | 7.55 (at 40° C.) | 308 |
| Ink 13 | 5.25 (at 40° C.) | 135 |
| Ink 14 | 7.05 (at 40° C.) | 177 |
| Ink 15 | 11.7 (at 40° C.) | 55.6 |
| Ink 16 | 3.25 (at 40° C.) | 334 |
| Ink 17 | 7.15 (at 40° C.) | 138 |
| Ink 18 | 3.65 (at 60° C.) | 170 |
| Ink 19 | 5.05 (at 40° C.) | 43 |
| Ink 20 | 12.4 (at 40° C.) | 126.7 |
| Ink 21 | 6 (at 65° C.) | 262 |
| Ink 22 | 10.5 (at 60° C.) | 362 |

Other embodiments are within the scope of the following claims.

What is claimed is:

1. A printing process, comprising:
melting a hot melt ink composition in a printhead in an ink jet printer, the hot melt ink composition comprising at least one wax and at least one conductive agent and the composition having a conductivity of from about 5 μS/cm to about 75 μS/cm in a melted state, and ejecting the hot melt ink composition from the printhead continuously to form an ink stream and ink drops, the ink drops having substantially no net electric charge.

2. The process of claim 1, further comprising deflecting the ink stream by at least one deflection electrode to an ink recovery gutter.

3. The process of claim 2, wherein the ink drops are substantially not deflected by the at least one deflection electrode and the process further comprises directing the ink drops to a substrate to form an image.

4. The process of claim 1, wherein the ink drops are substantially not deflected by at least one deflection electrode and the process further comprises directing the ink drops to an ink recovery gutter.

5. The process of claim 1, further comprising deflecting the ink stream by at least one deflection electrode to a substrate to form an image.

6. The process of claim 1, wherein the at least one wax comprises an amide alcohol wax, a C6-C58 primary alcohol wax, a C6-C58 carboxylic acid wax, a urethane wax, an ether wax, or an ester wax.

7. The process of claim 6, wherein the amide alcohol wax is lauryl monoethanolamide, stearyl monoethanolamide, lauryl isopropanolamide, or coconut fatty acid diethanolamide.

8. The process of claim 1, wherein the composition comprises from about 70 wt % to about 99 wt % of the at least one wax.

9. The process of claim 1, wherein the at least one conductive agent comprises a salt.

10. The process of claim 9, wherein the salt is a quaternary phosphonium salt, a quaternary ammonium salt, an imidazolium salt, or an alkali salt.

11. The process of claim 9, wherein the salt is a liquid electrolyte at ambient temperature.

12. The process of claim 1, wherein the composition comprises from about 0.05 wt % to about 5 wt % of the at least one conductive agent.

13. The process of claim 1, wherein the composition further comprises at least one colorant and the at least one colorant comprises a dye or a pigment.

14. The process of claim 1, wherein the composition has a melt viscosity of from about 1 cP to about 25 cP measured at a jetting temperature.

15. A hot melt ink composition, comprising:
at least one wax, and
at least one conductive agent,
wherein the composition has a conductivity of from about 5 μS/cm to about 75 μS/cm in a melted state.

16. The composition of claim 15, wherein the composition has a conductivity of from about 5 μS/cm to about 50 μS/cm in a melted state.

17. The composition of claim 15, wherein the at least one wax comprises an amide alcohol wax, a C6-C58 primary alcohol wax, a C6-C58 carboxylic acid wax, a urethane wax, an ether wax, or an ester wax.

18. The composition of claim 17, wherein the amide alcohol wax is lauryl monoethanolamide, stearyl monoethanolamide, lauryl isopropanolamide, or coconut fatty acid diethanolamide.

19. The composition of claim 15, wherein the composition comprises from about 70 wt % to about 99 wt % of the at least one wax.

20. The composition of claim 15, wherein the at least one conductive agent comprises a salt.

21. The composition of claim 20, wherein the salt is a quaternary phosphonium salt, a quaternary ammonium salt, an imidazolium salt, or an alkali salt.

22. The composition of claim 20, wherein the salt is a liquid electrolyte at ambient temperature.

23. The composition of claim 15, wherein the composition comprises from about 0.05 wt % to about 5 wt % of the at least one conductive agent.

24. The composition of claim 15, wherein the composition further comprises at least one colorant and the at least one colorant comprises a dye or a pigment.

25. The composition of claim 15, wherein the composition has a melt viscosity of from about 1 cP to about 25 cP measured at a jetting temperature.

26. The composition of claim 15, wherein the composition consists of:
(1) the at least one wax,
(2) the at least one conductive agent,
(3) optionally, the at least one colorant,
(4) optionally, at least one resin,
(5) optionally, at least one tackifier,
(6) optionally, at least one plasticizer,
(7) optionally, at least one antioxidant, and
(8) optionally, at least one dispersant.

27. A product, comprising a substrate and a solid ink defining an image on the substrate, the solid ink comprising the hot melt ink composition of claim 15.

28. The product of claim 27, wherein the image is a 3D article.

* * * * *